United States Patent [19]
Blevins

[11] Patent Number: 5,813,127
[45] Date of Patent: Sep. 29, 1998

[54] ART DECKLE

[76] Inventor: Patricia A. Blevins, P.O. Box 5314, Englewood, Fla. 34224-1428

[21] Appl. No.: 762,391

[22] Filed: Dec. 9, 1996

[51] Int. Cl.[6] .................................................. G01B 3/04
[52] U.S. Cl. ................................................ 33/492; 33/494
[58] Field of Search ........................... 33/492, 493, 494, 33/566; 493/353, 354, 355, 361, 378, 340; 30/351, 355, 357

[56] References Cited

U.S. PATENT DOCUMENTS

| | | | |
|---|---|---|---|
| 205,795 | 7/1878 | Green | 33/492 |
| 206,410 | 7/1878 | Adler | 30/357 |
| 239,691 | 4/1881 | Appleton | 33/494 |
| 306,440 | 10/1884 | Stone et al. | 30/357 |

FOREIGN PATENT DOCUMENTS

| | | | |
|---|---|---|---|
| 1045494 | 11/1953 | France | 33/566 |
| 821557 | 11/1951 | Germany | 33/494 |
| 219691 | 6/1942 | Switzerland | 33/494 |
| 20799 | 10/1908 | United Kingdom | 33/492 |
| 1585762 | 3/1981 | United Kingdom | 33/494 |

*Primary Examiner*—Thomas B. Will
*Attorney, Agent, or Firm*—Frank A. Lukasik

[57] ABSTRACT

A device for forming a deckle edge, an uncut, softly frayed, natural tear for elegant paper edges having a flat hardened stainless steel tool with a deckel edge formed on a first edge and a straight edge formed on a second edge. The top surface has an image of a metric scale formed along the deckle edge, and an image of an inch scale formed along the straight edge, each of the scales having a zero center formed with increments of the scale increasing outwardly toward each end. A hanging hole is also provided at one end.

2 Claims, 3 Drawing Sheets

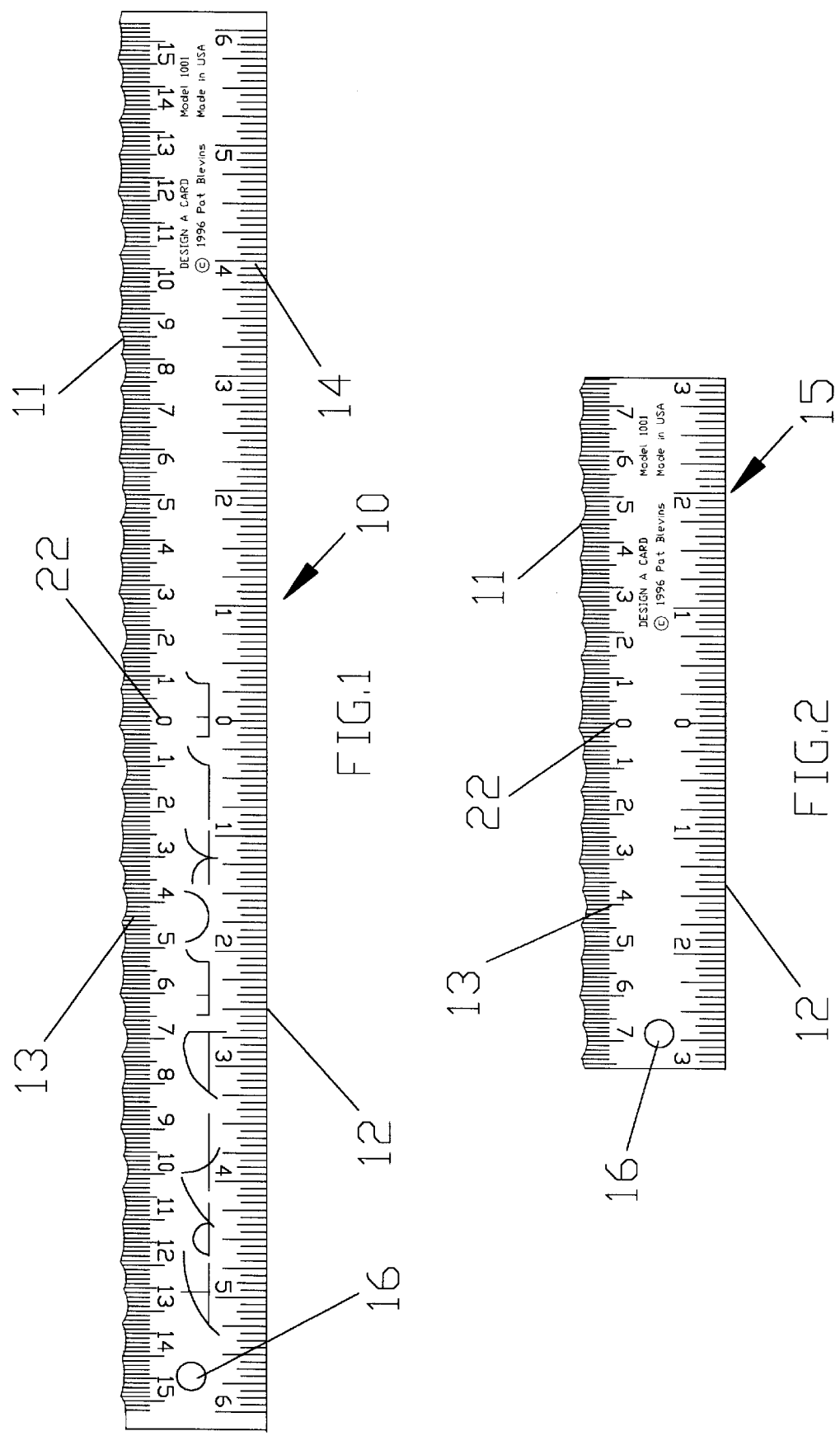

ART DECKLE

BACKGROUND OF THE INVENTION

FIELD OF THE INVENTION

The invention relates generally to creating a decorative edge on paper and more particularly, to create an uncut, softly frayed, natural tear for elegant paper edges.

For centuries, methods of creating paper produced a natural, soft, feathered edge on huge sheets of paper. Producing a feathered edge artificially is commonly known as "deckle". Deckle, as defined in Websters Third New International Dictionary, a deckle is known as the detachable frame around the outside of a papermaker's mold. Also, a deckle strap is either of the endless rubber bands that run longitudinally upon the edges of the wire of a paper machine and thereby determine the width of the web. A deckle edge is the rough, untrimmed edge of paper left by the deckle or produced artificially (as by sawing the edges of the trimmed sheets).

SUMMARY OF THE INVENTION

The instant invention is a deckle edge tool made from non-rusting, hardened, stainless steel, and resembles a steel ruler having a straight edge on a first edge and a deckle edge on a second edge. A first edge is marked with inches and the second edge contains metric distances. This easy-to-use, hardened stainless steel tool allows a user to create any length deckle, thereby adding a touch of elegance to cards, notes, signs, art work, etc. The -0- center feature helps the user to easily find the center of design, line of copy, or card, etc.

Using the art deckle of the invention creates an edge similar to the edge on expensive, hand-cast paper. The soft, feathered edge coordinates with art work better than a cut edge. The art deckle visually enlarges or emphasizes a too-small design by deckling either the design or mat to place behind the design. It also creates impact interest with deckled, layered, paper in contrasting colors and textures. The art deckle of the invention provides a natural, soft, feathered edge look (a soft uncut look), quickly, easily, and inexpensively. The user decides where the deckle will be, not the manufacturer of the paper. Each use provides a different look because the basic determining factors change with paper weight thickness, grain, dampened or dry edge, and humidity content.

This easy-to-use, hardened stainless tool allows the user to create any length deckle adding a touch of elegance to cards or notes, signs, art work, etc. The -0- center feature helps the user to easily find the center of design, line of copy or card, etc. The two sizes are provided for different edge sizes.

BRIEF DESCRIPTION OF THE DRAWINGS

FIG. 1 is a top perspective view of the one foot long, deckle edge tool in accordance with the invention.

FIG. 2 is a top view of the six inch embodiment of the deckel edge tool in accordance with the invention.

DETAILED DESCRIPTION OF THE INVENTION

Figure 3:
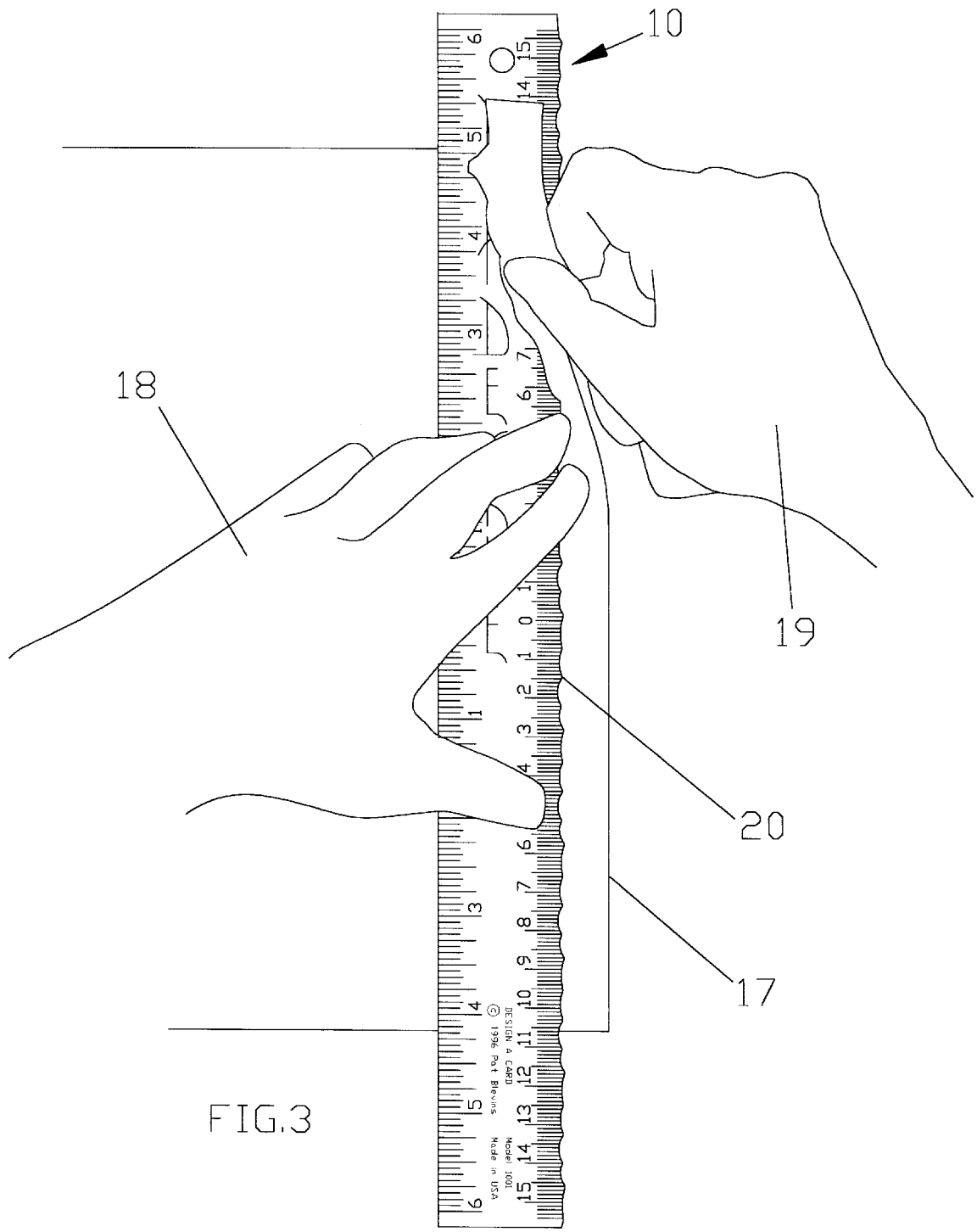
FIG. 3 is a top perspective view of the deckle edge being formed by a user.
Figure 4:
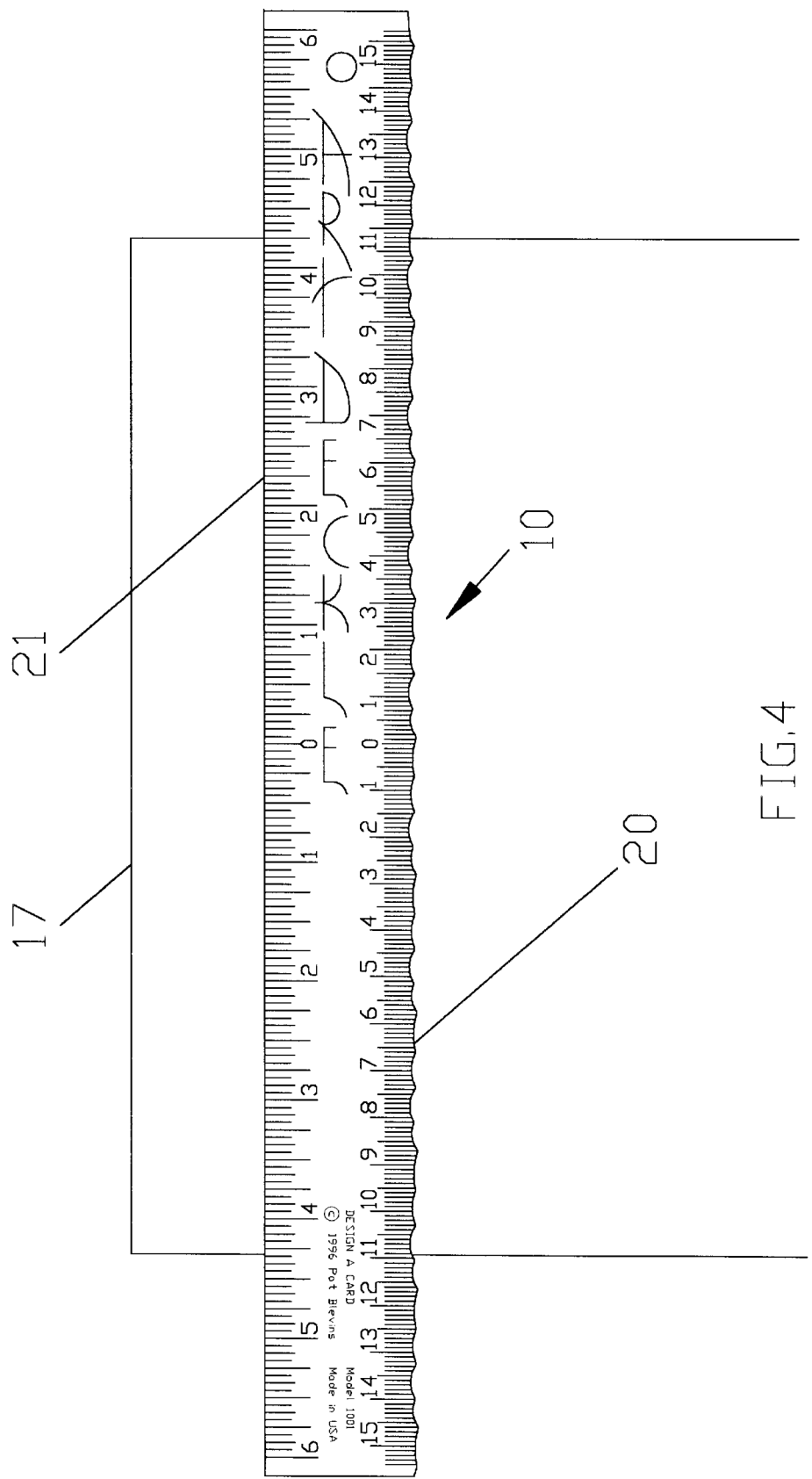
FIG. 4 is a top view of the six inch, deckle edge tool in a centering position in accordance with the invention.

The present invention is a tool used for forming a deckle edge, an uncut, softly frayed, natural tear for elegant paper edges. The art deckle tool of the invention is generally indicated by the numeral 10. The deckle tool 10 consists of a deckle cutting edge 11, a straight edge 12, an image of a metric scale 13 formed along a first edge, deckle cutting edge 11, and an image of an inch scale 14 formed along a second edge, straight edge 12. Each of the scales 13 and 14 have a zero (-0-) center 22 to assist in locating the center of a card 17 (mat, line of type, etc.). As shown in FIG. 4, the deckle tool 10 is adjusted in left and right increments until they match. A hole 16 is formed at one end of the deckle edge tool 10 for convenience in hanging on a peg board for easy access.

The deckle edge tool 10, shown in FIG. 1 is manufactured from a quality, hardened, stainless steel, 0.020 thick and 12" long. A shorter version, 6" long is shown in FIG. 2. The deckle edge tool 10 may be formed with a downwardly facing slight curve (not shown) to keep the outer ends pressed against the paper 17 with a small pressure on the -0- center 22.

In a preferred embodiment, the deckle cutting edge 11 may be milled or formed by a computer controlled cutting device, or laser cut, to provide an accurately reproduced shape and a sharp cutting surface on the reverse side to begin the tearing action required for a deckle edge 20.

The first step in forming the deckle edge is to dampen ¾" edge of cover stock or watercolor (heavy paper) using a clean paint brush and water and allow to sit for one minute. The deckle edge tool 10 is placed ½" from the edge of the paper 17 and held downwardly as shown by left hand 18. The ½" of the paper edge is then gripped with the fingers of hand 19 and is torn by pulling the paper 17 upwardly to force the paper 17 against the deckle edge tool 10. When the edge is completed, the deckle edge tool 10 is removed and the deckle edge 20 is smoothed outwardly. The underside of the paper is the proper side of the deckle edge 20. When using bond (lightweight) paper, the dampening step may be omitted.

When using Mulberry paper, only ½" of the edge of the paper is dampened. The deckle edge tool 10 is placed ¼" from the edge of the paper and held firmly in position. The point of closed scissors is dragged back and forth along the deckle cutting edge 11 until the paper 17 disintegrates. The deckle edge tool 10 is removed and the fibers are smoothed away from the paper thus creating delicate, wispy, strands of fibers.

To score a work being created, the -0- center 22 is placed near the center of the card, mat, line of type, etc. and the left and right increments are adjusted until they match. There is no need to calculate fractions. A dot may be lightly penciled at center mid-top and mid-bottom and a vertical line is made to mark the center. A non-reproducible blue pencil may be used if using the alignment for a copier. To score the card or paper for folding, the straight edge 12, of deckle edge tool 10, is placed on the center marks and the paper is scored with the dull edge of a table knife or other narrow edged tool. The -0- center 22 provides a quick and easy method for centering and aligning without having to use fractions to calculate the distances.

While the invention has been explained with respect to a preferred embodiment thereof, it is contemplated that various changes may be made in the invention without departing from the spirit and scope thereof.

What is claimed is:

1. A device for forming a deckle edge, an uncut, softly frayed, natural tear for elegant paper edges, said tool comprising:

a flat, rectangular shaped, hardened stainless steel tool having a first edge, a second edge, a first end and a second end, a top surface, and a reverse side, a deckle cutting edge formed on said first edge, said cutting edge having a sharp cutting surface on said reverse side, said cutting edge being formed by a computer controlled cutting device to provide an accurately, reproduced shape, a straight edge formed on said second edge, an image of a metric scale formed on said top surface along said deckle cutting edge, said metric scale having a zero center formed with increments of said scale increasing outwardly toward said first and second ends, an image of an inch scale formed on said top surface along said straight edge, said inch scale having a zero center formed with increments of said scale increasing toward said first and second ends, said deckle edge tool formed with a downwardly facing curve for keeping said first and second ends pressed against the paper with a small pressure downwardly on said top surface, and a hole formed near said first end for hanging convenience.

2. A device for forming a deckle edge of claim 1 wherein said stainless steel is 0.020 inches thick, quality, hardened stainless steel, and in the range of six inches to twelve inches long.

* * * * *